Figure 1:
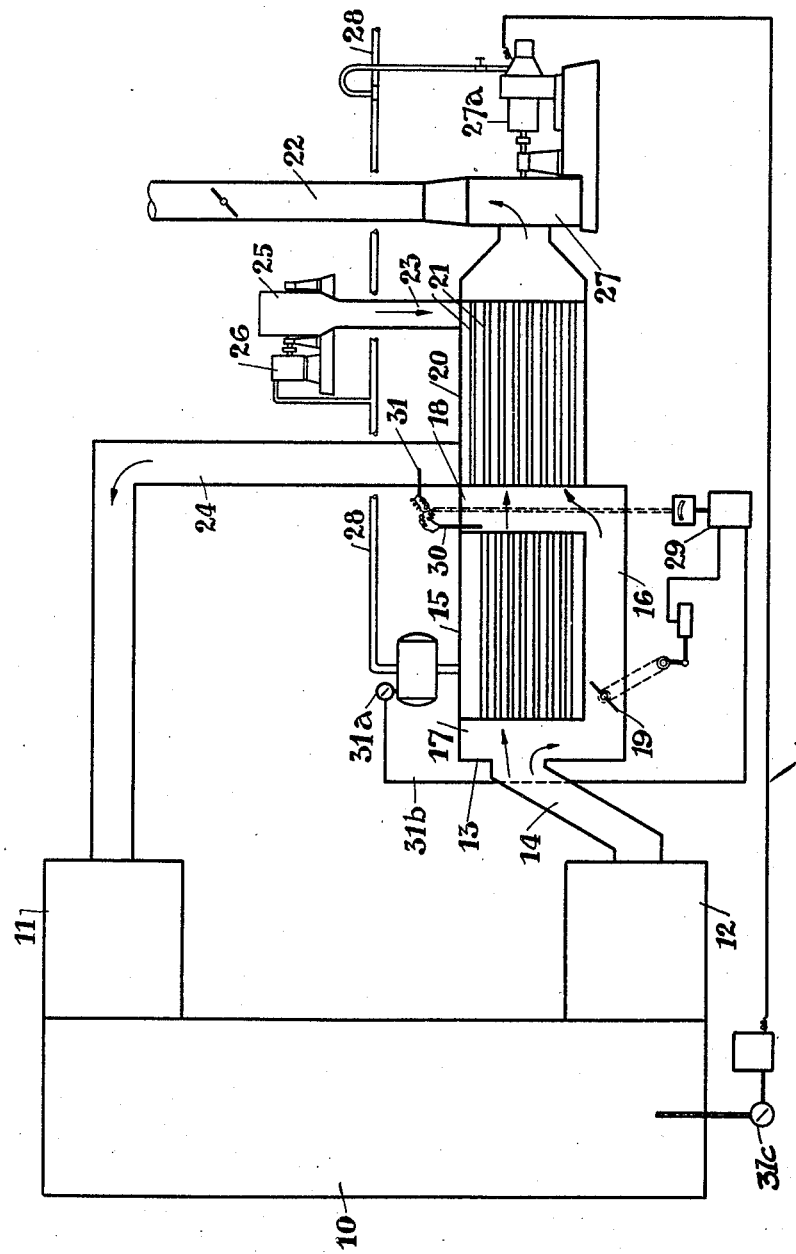

Nov. 10, 1936.　　　A. J. EBNER　　　2,060,290
HEAT RECOVERY SYSTEM
Filed June 22, 1935　　　2 Sheets-Sheet 2

INVENTOR.
Alfred J. Ebner
BY
ATTORNEYS

Patented Nov. 10, 1936

2,060,290

UNITED STATES PATENT OFFICE 2,060,290

HEAT RECOVERY SYSTEM

Alfred J. Ebner, Chicago, Ill., assignor to Freyn Engineering Company, Chicago, Ill., a corporation of Maine Application June 22, 1935, Serial No. 27,967

17 Claims. (Cl. 122—7)

The present invention relates to improvements in heat recovery systems.

It is frequently desirable in connection with furnaces or the like which deliver gases at high temperature to utilize a part, generally a major part, of the sensible heat or the latent heat of the gases for the purpose of the heating of air or other gas or liquids, the production of steam, and other uses. Sometimes it is desired to utilize waste heat gas for use in instrumentalities having an upper limit of temperature which is substantially lower than the temperature of the waste heat gas, or substantially lower than the temperature which can be produced by the combustion of the waste heat gas. To attempt to heat the instrumentalities referred to to moderate temperatures directly by waste heat gases of high temperature introduces difficult problems in control and in protection of the apparatus and in safeguarding the substances being heated in said instrumentalities against overheating. Taking an example from open hearth furnace practice, the brick regenerators associated therewith are not well adapted to low temperature heat exchange, metallic preheaters for air are not well adapted to high temperature heat exchange, and gas-liquid heat exchangers are best suited to temperatures midway of the range between the discharge temperature at the open hearth and atmospheric temperature.

In the drawings the means for delivering high temperature gas take the form of an open hearth furnace or a cupola. The means for utilizing the heat units in the hot gas which is best suited for moderate temperatures is illustrated in the form of a boiler, and the means for utilizing the heat units at the lower temperatures of the gas is illustrated as an air preheater. As the description proceeds it will be apparent that the invention is of broader application than is indicated by the drawings. For example, the means for utilizing the heat units in the moderate range of temperatures may take the form of a heater for fuel oil for raising the temperature of said fuel oil to better condition it for combustion or other purposes. Such devices in the description which follows will be referred to broadly as liquid cooled heat exchangers. Devices for utilizing the heat units of the waste gas at the lower temperatures thereof may of course be used for the heating of gas other than air, if preferred. In the description which follows, mechanism for utilizing the heat units in which the substance to be heated is air or other gas, such means will be referred to as gas cooled heat exchangers.

In understanding the description which follows it should be borne in mind that liquid cooled heat exchangers, by reason of the high heat storage capacity of liquid, are adapted for heat transfer at temperatures higher than are gas cooled heat exchangers.

An object of the present invention is to utilize waste heat gases in an efficient manner for the preheating of air or other gas and for the production of steam to the end that heat units in the waste gas may be utilized to the best advantage for the required temperature ranges of the instrumentalities involved.

A further object is to provide a heat recovery system for effectively utilizing hot gases through a greater temperature range than has heretofore been commercially feasible and to provide for each part of said temperature range a heat utilizing means most suitable and economical for its particular part of said heat range.

A further object is to provide a heat recovery system for hot gases in which a portion of the heat of the hot gases is absorbed in liquid cooled means to reduce the temperature of said gases to a point where they can be passed safely through relatively inexpensive gas cooled heat recovery means.

A further object is to provide a heat recovery system in which the heat units are recovered in two different media, means being provided to vary the absorption of heat units by one of said media in order to control the absorption of heat units by the other of said media without sacrificing total heat absorption.

A further object is to provide a heat recovery system for hot gases including a boiler for utilizing heat units in said hot gases in a certain temperature range of said gases and having gas cooled heat transfer means for utilizing heat units in a lower temperature range, said system having means to control the distribution of said hot gases, the elements of said system being so disposed as to utilize economically the heat units not utilized in said boiler.

A further object is to provide a heat recovery system for hot gases having means to economically temper hot gases prior to their use in a heat absorbing means, said tempering means being adapted to absorb and utilize a controlled portion of the heat units in the waste heat gas available.

A further object is to provide a heat recovery system for recovering efficiently the heat units in hot gases by means of relatively inexpensive instrumentalities.

Further objects will appear as the description proceeds.

Referring to the drawings—

Figure 2:
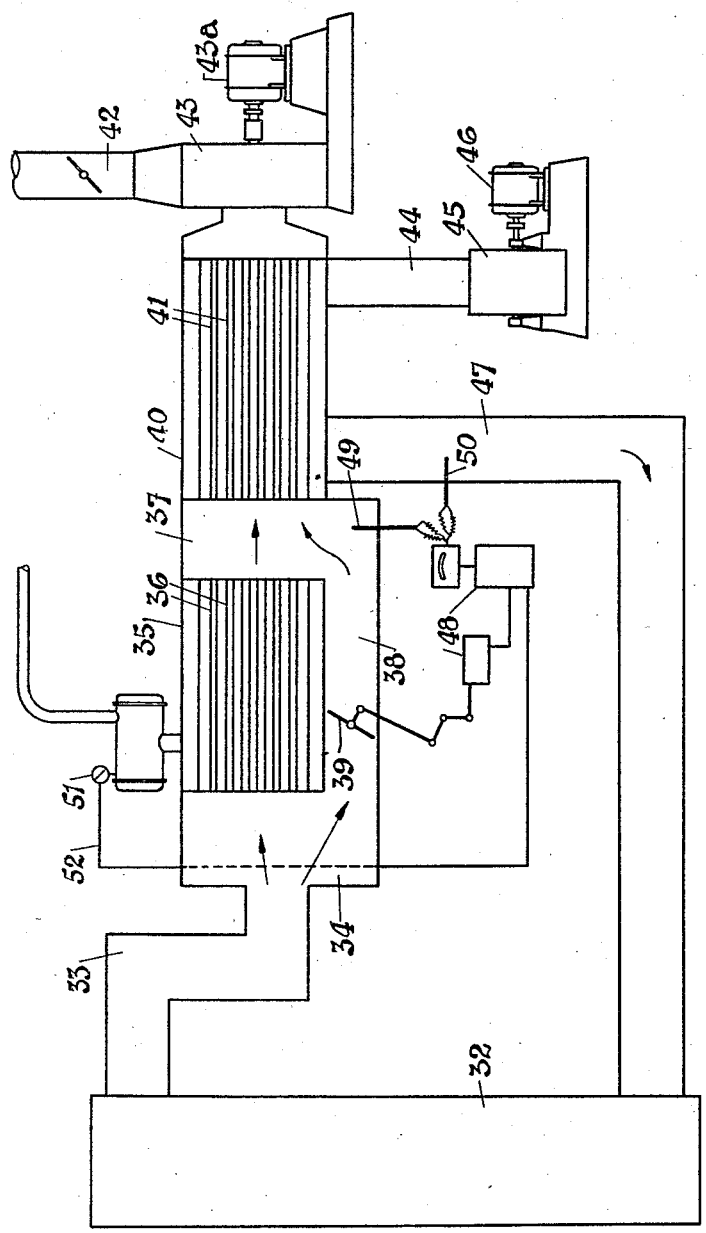

Figure 1 is a diagrammatic view illustrating an embodiment of the present invention in which the source of waste heat gas is an open hearth furnace, in the operation of which it is necessary to preheat air at high temperatures; and Figure 2 represents another embodiment of the present invention utilizing a cupola which does not require a supply of air at the high temperatures required for an open hearth furnace.

Referring first to Figure 1, the numeral 10 indicates an open hearth furnace having associated therewith the usual regenerators 11 and 12. As will be understood by those skilled in the art, means will be provided for reversing the regenerators from air to blast or from blast to air. Means for this purpose form no part of the present invention and are not illustrated.

As the parts are shown in Figure 1, the regenerator 11 is on air, that is—it is giving up heat to air passing through said regenerator into the furnace 10, and the regenerator 12 is on blast, that is—it is being heated up by the hot waste heat gases being delivered through it by the open hearth furnace 10. The numeral 13 indicates a steam unit connected to the regenerator which is on blast through the waste gas flue 14. Said steam unit includes the boiler 15 and the by-pass duct 16, though, as indicated above, the member 15 may be any liquid cooled heat exchanger. The boiler 15 has been illustrated in the form of a fire tube boiler having its fire tubes communicating with the inlet header 17 and with the outlet header 18. The by-pass duct 16 provides a by-pass whereby waste heat gases may, when desired, be shunted away from the fire tubes of the fire tube boiler 15. Said by-pass duct is controlled by the damper 19, which may be controlled by mechanism which will be referred to presently.

The numeral 20 indicates an air preheater having the fire tubes 21—21 extending longitudinally thereof. It will be understood that the member 20 may be any heat exchanger which is cooled by air or other gas, or, in other words, in which the substance being heated is air or other gas. Said preheater 20, as illustrated, has the function of preheating the air delivered to the regenerators 11 and 12 and utilizes a substantial portion of the heat units in the gases which have passed through the tubes of the boiler 15 or the by-pass duct 16. The fire tubes 21—21 communicate at one end thereof with the header 18 of the steam unit 13. Said fire tubes 21 communicate at their other ends with the stack 22. The air preheater 20 is provided with the air intake 23 and with the air outlet duct 24, which duct 24 leads to the regenerator which is on air, that is—as the parts are illustrated in Figure 1, to the regenerator 11. Air is forced into the intake 23 by the blower 25 driven by the motor or turbine 26. The waste heat gases which have passed through the tubes 21—21 of the preheater 20 may be accelerated outwardly of said preheater and up through the stack 22 by means of a blower 27 propelled by the turbine 27a. A steam pipe 28 is illustrated connected with the boiler 15. Said steam pipe 28 may supply steam for operating the turbine 26 and the turbine 27a.

The damper 19, which controls the by-pass duct 16 of the steam unit 13, may be controlled by certain damper regulating mechanism, indicated as a whole by the numeral 29. The regulating mechanism 29 may be responsive to a thermo-couple 30 located in the outlet header 18 of the steam drum 13 or to a thermo-couple 31 located in the outlet duct 24 leading from the air preheater 20, or the regulating mechanism 29 may be conjointly responsive to both the thermo-couple 30 and the thermo-couple 31. In other words, the regulating mechanism 29 may, for example, be under the control of the thermo-couple 31 unless and until the gases in the header 18 are too hot for the gas-cooled heat exchanger 20, in which case the thermo-couple 30 will control the regulating mechanism 29 to cause closing movement of the damper 19, whereby more of the hot gases will be directed through and have their heat absorbed by the boiler 15. Mechanism suitable for the purpose for controlling the damper 19 in response to either the temperature in the header 18 or the duct 24, or both, is readily obtainable in the open market and need not be described herein. As an alternative, the boiler 15 may be provided with the steam gauge 31a, which, through the cable 31b, controls the regulating mechanism 29. Said gauge 31a will control the damper 19 to maintain constant steam functions at the boiler regardless of steam delivery therefrom. Said gauge may be a pressure gauge or flow gauge, or other gauge. The numeral 31c indicates a pressure gauge responsive to pressure within the furnace 10. Said gauge 31c, through the cable 31d, controls the turbine 27a to maintain constant draft upon the furnace 10.

Referring now to Figure 2, the numeral 32 indicates a cupola which delivers combustible waste heat gas. Communicating with the cupola 32 is the waste gas flue 33 which leads to the combustion chamber 34 forming part of a steam unit 35. Said steam unit 35 includes the fire tube boiler 36, the tubes of which at one end have communication with the combustion chamber 34 and at the other end have communication with the outlet header 37. The numeral 38 indicates a by-pass duct communicating with the combustion chamber 34 and the outlet header 37 whereby products of combustion from the combustion chamber 34 may be shunted around the tubes of the boiler 36. The by-pass effect of the duct 38 may be controlled by means of the damper 39, which is responsive to mechanism to be referred to presently.

Communicating with the outlet header 37 of the steam unit 35 is the air heater 40, which includes a plurality of gas tubes 41—41. Said gas tubes 41 communicate at one end with the outlet header 37 of the steam unit 35 and at the other ends communicate with the stack 42. Gases from the tubes 41—41 of the air heater 40 may be accelerated up through the stack by means of a blower 43 driven by the motor 43a.

The numeral 44 indicates an air duct supplied by a blower 45 driven by the motor 46. Said air duct delivers air to the air heater 40, which air flows past the gas tubes 41, being heated in its passage, and is delivered from the air heater 40 through the hot air flue 47, which delivers heated air to the cupola 32.

The damper 39 in the by-pass 38 of the steam unit 35 is controlled by regulating mechanism indicated as a whole by the numeral 48. Said regulating mechanism 48 may be controlled by a thermo-couple 49 located in the outlet header 37 of the steam unit 35, or by the thermo-couple 50 located in the hot air flue 47; or, said regulating mechanism 48 may be controlled conjointly by both of said thermo-couples, similarly to the action of the thermo-couples 30 and 31 above described. Control mechanism suitable for controlling the damper 39 in response to temperature changes in the header 37, the hot air flue 47, or conjointly in response to temperature changes in said header 37 and the flue 47 may be readily purchased in the open market and need not be described herein. As an alternative, the boiler 7

36 may be provided with the steam gauge 51, which through the cable 52, controls the regulating mechanism 48. Said gauge 51, which may be responsive to steam pressure, steam flow or other function of the boiler or other liquid cooled heat exchanger 36, will control the damper 39 to maintain constant functions at the boiler.

The mode of operation of each of the described embodiments of the present invention will be clear without detailed explanation. Referring briefly first to Figure 1, it may be stated that the waste heat gases emanating from the open hearth furnace 10 will pass through the regenerator which is on blast (that is—the regenerator 12 in the drawings). Said regenerator according to usual practice will be constructed of refractory material and will reduce the temperature of the hot gases delivered by the furnace 10 from, for example, approximately 2600 deg. F. to 1400 deg. F. The hot gases then enter the steam unit 13, which still further reduces the temperature of the gases to perhaps 900 deg. F. Said hot gases then enter the air preheater 20, which further reduces their temperatures to about 250 deg. F. The hot gases at this reduced temperature then pass to the stack 22.

The combustion air for the open hearth furnace 10 is delivered from the atmosphere at, for example, 70 deg. F. to the air preheater 20, being discharged therefrom into the hot air duct 24 at a temperature approaching 900 deg. F. This air then passes to the regenerator which is on air (indicated as regenerator 11 in the drawings), where the combustion air is further raised to a temperature of say 2000 deg. F. Water may be delivered to the boiler 15 at a temperature of 200 deg. F. and may attain a steam temperature of perhaps 350 deg. F.

The above figures are merely illustrative and should not be considered in a limiting sense. Said figures have been recited merely to show that there is a good differential between the waste gas temperature and the temperature of the medium being heated.

Inasmuch as the air preheater 20 will ordinarily be made of metal, the temperatures attained in said air preheater are suitable therefor, so that the use of expensive alloys for resistance to high temperatures is not required in this preheater.

Reference will now be made to the by-pass duct 16, which may be controlled by the damper 19. By controlling the by-pass of waste heat gases around the boiler 15, the temperature in the header 18 and/or in the hot air duct 24 may be controlled. As indicated above, the damper 19 may be controlled either in response to the hot air being delivered through the duct 24, or in response to temperatures of the waste heat gases about to enter the preheater 20, or the control may be a conjoint one whereby to hold substantially constant the temperature of the air in the air duct 24 unless and until the gases about to enter the tubes 21 of the air preheater get too hot, at which time the thermo-couple 30 will cause closing movement of the damper 19, thereby causing the boiler 15 to absorb a greater portion of the heat units and thereby save the air heater 20 from the action of gases at destructive temperatures. Expressed in other language, the damper 19 is controlled in response to temperature functions of the preheater 20, that is—either in response to temperature changes in the hot gases entering said preheater or in response to temperature changes in the heated air delivered by said preheater; or said damper 19 may be controlled by the steam gauge 31a to maintain constant functions at the boiler 15.

The mode of operation of the structure shown in Figure 2 requires only brief explanation. In this case the waste heat gases are combustible and are burned in the combustion chamber 34. Figure 2 is illustrative of a construction in which only a moderate degree of air preheat is desired. According to this construction, the damper 39 may be regulated in response to temperatures within the header 37 or within the hot air flue 47, or it may be controlled conjointly according to the temperatures within said instrumentalities, similarly to the action of the damper 19, described above, or said damper 39 may be controlled to maintain constant functions at the boiler, similarly to the action of the steam gauge 31a, described above.

Though certain embodiments of the present invention have been described more or less in detail, it will be understood that many modifications will occur to those skilled in the art. It is intended to cover all such modifications that fall within the scope of the appended claims.

What is claimed is—

1. In a heat recovery system, in combination, means for delivering gases containing heat units, a liquid cooled heat exchanger adapted and positioned to utilize a portion of said heat units, a gas cooled heat exchanger for delivering gaseous medium to said gas delivery means, said gas cooled heat exchanger being positioned to receive heat units which have passed through said liquid cooled heat exchanger, said liquid cooled heat exchanger having a by-pass in parallel therewith, and means for regulating said by-pass in response to conditions at said gas cooled heat exchanger.

2. In a heat recovery system, in combination, means for delivering gas having heat units therein, a liquid cooled heat exchanger connected to said gas delivering means to utilize a portion of the heat units in said gas, a gas cooled heat exchanger connected to said gas delivering means for delivering heated gaseous medium thereto, said gas cooled heat exchanger being positioned to receive gases which have given up a portion of their heat units to said liquid cooled heat exchanger, a shunt passage around said liquid cooled heat exchanger, and means for throttling said shunt passage, said throttling means being responsive to conditions controlling the temperature of gaseous medium delivered to said gas delivering means.

3. In a heat recovery system, in combination, a liquid cooled heat exchanger and a gas cooled heat exchanger connected in series for the reception of hot gases, a shunt passageway around said liquid cooled heat exchanger, damper means for controlling said passageway, and means for controlling said damper means responsive to functions of said gas cooled heat exchanger.

4. In a heat recovery system, in combination, a liquid cooled heat exchanger and a gas cooled heat exchanger connected in series for the reception of hot gases, a shunt passageway around said liquid cooled heat exchanger, damper means for controlling said passageway, and means for controlling said damper responsive to temperature functions of said gas cooled heat exchanger.

5. In a heat recovery system, in combination, means for delivering gas containing heat units, a liquid cooled heat exchanger for utilizing the heat units in said gas, a gas cooled heat exchanger in series with said liquid cooled heat exchanger, and means responsive to conditions at said gas cooled heat exchanger for controlling the division of heat units utilized in said liquid cooled heat exchanger and in said gas cooled heat exchanger.

6. In a heat recovery system, in combination, means for delivering gas containing heat units, a liquid cooled heat exchanger for utilizing the heat units in said gas, a gas cooled heat exchanger in series with said liquid cooled heat exchanger, a by-pass duct around said liquid cooled heat exchanger, and damper means in said duct for controlling the division of heat units utilized in said heat exchangers, said damper means being responsive to the temperature of gas heated by said gas cooled heat exchanger.

7. In a heat recovery system, in combination, means for delivering gas containing heat units, a liquid cooled heat exchanger for utilizing the heat units in said gas, a gas cooled heat exchanger in series with said liquid cooled heat exchanger, a by-pass duct around said liquid cooled heat exchanger, damper means in said duct for controlling the division of heat units utilized in said heat exchangers, and means for controlling said damper responsive to the temperature of gases entering said gas cooled heat exchanger.

8. In a heat recovery system, in combination, means for delivering gas containing heat units, a liquid cooled heat exchanger for utilizing the heat units in said gas, a gas cooled heat exchanger in series with said liquid cooled heat exchanger, a by-pass duct around said liquid cooled heat exchanger, damper means in said duct for controlling the division of heat units utilized in said heat exchangers, and means for controlling said damper conjointly responsive to the heated gas delivered by said gas cooled heat exchanger and to the gases entering said gas cooled heat exchanger.

9. In combination, an open hearth furnace, a pair of regenerators operatively connected thereto, a waste heat boiler adapted to be connected to one of said regenerators, an air preheater connected in series with said boiler, a hot air duct for conducting heated air from said preheater to the other of said regenerators, a by-pass around said boiler, a damper in said by-pass, and means for controlling said damper responsive to heat conditions in said system beyond said boiler.

10. In combination, an open hearth furnace, a pair of regenerators operatively connected thereto, a waste heat boiler adapted to be connected to one of said regenerators, an air preheater connected in series with said boiler, a hot air duct for conducting heated air from said preheater to the other of said regenerators, a by-pass around said boiler, a damper in said by-pass, a gauge responsive to functions of said boiler, and means for controlling said damper responsive to said gauge.

11. In combination, an open hearth furnace, a pair of regenerators operatively connected thereto, a waste heat boiler adapted to be connected to one of said regenerators, an air preheater connected in series with said boiler, a hot air duct for conducting hot air from said preheater to the other of said regenerators, a by-pass around said boiler, a damper in said by-pass, and means for controlling said damper in response to the temperature within said hot air duct.

12. In combination, an open hearth furnace, a pair of regenerators operatively connected thereto, a waste heat boiler adapted to be connected to one of said regenerators, an air preheater connected in series with said boiler, a hot air duct for conducting hot air from said preheater to the other of said regenerators, a by-pass around said boiler, a damper in said by-pass, and means for controlling said damper in response to the temperature of hot gases entering said air preheater.

13. In combination, an open hearth furnace, a pair of regenerators operatively connected thereto, a waste heat boiler adapted to be connected to one of said regenerators, an air preheater connected in series with said boiler, a hot air duct for conducting hot air from said preheater to the other of said regenerators, a by-pass around said boiler, a damper in said by-pass, and means for controlling said damper conjointly responsive to the temperature of air within said air duct and to the temperature of gases entering said preheater.

14. In combination, means for delivering a combustible gas, a boiler having a combustion chamber associated therewith for burning said combustible gas, an air preheater for receiving products of combustion from said combustion chamber after said products of combustion have given up part of their heat units to said boiler, a by-pass around said boiler, and means responsive to conditions at said air preheater for controlling said by-pass to control the division of heat units in said products of combustion utilized by said boiler and said preheater.

15. In combination, means for delivering a combustible gas, a boiler having a combustion chamber associated therewith for burning said combustible gas, an air preheater for receiving products of combustion from said combustion chamber after said products of combustion have given up part of their heat units to said boiler, a by-pass around said boiler, and means for controlling said by-pass to control the division of heat units in said products of combustion utilized by said boiler and said preheater, said controlling means being responsive to the temperature of the air delivered by said preheater.

16. In combination, means for delivering a combustible gas, a boiler having a combustion chamber associated therewith for burning said combustible gas, an air preheater for receiving products of combustion from said combustion chamber after said products of combustion have given up part of their heat units to said boiler, a by-pass around said boiler, and means for controlling said by-pass to control the division of heat units in said products of combustion utilized by said boiler and said preheater, said controlling means being responsive to the temperature of gas entering said preheater.

17. In combination, means for delivering a combustible gas, a boiler having a combustion chamber associated therewith for burning said combustible gas, an air preheater for receiving products of combustion from said combustion chamber after said products of combustion have given up part of their heat units to said boiler, a by-pass around said boiler, and means for controlling said by-pass to control the division of heat units in said products of combustion utilized by said boiler and said preheater, said controlling means being conjointly responsive to the temperature of the air delivered by said air preheater and to the temperature of gas entering said air preheater.

ALFRED J. EBNER.